(12) United States Patent
Ekselius et al.

(10) Patent No.: US 10,523,005 B2
(45) Date of Patent: Dec. 31, 2019

(54) CONTROLLING TRANSFER OF ELECTRICAL POWER

(71) Applicant: MasterCard International Incorporated, Purchase, NY (US)

(72) Inventors: Lukas Ekselius, Dubai (AE); Fikret Ates, Waterloo (BE); Sebastien Pochic, Brussels (BE)

(73) Assignee: Mastercard International Incorporated, Purchase, NY (US)

( * ) Notice: Subject to any disclaimer, the term of this patent is extended or adjusted under 35 U.S.C. 154(b) by 260 days.

(21) Appl. No.: 15/235,820

(22) Filed: Aug. 12, 2016

(65) Prior Publication Data
US 2017/0047737 A1    Feb. 16, 2017

(30) Foreign Application Priority Data

Aug. 14, 2015 (EP) .................................... 15181053

(51) Int. Cl.
*H02J 3/14* (2006.01)
*G06Q 20/18* (2012.01)
(Continued)

(52) U.S. Cl.
CPC .............. *H02J 3/14* (2013.01); *G06Q 20/18* (2013.01); *G06Q 50/06* (2013.01); *G07F 15/005* (2013.01);
(Continued)

(58) Field of Classification Search
CPC ...... G06Q 20/18; G06Q 50/06; G07F 15/005; H02J 3/14; H02J 2003/143; Y02T 90/12
See application file for complete search history.

(56) References Cited

U.S. PATENT DOCUMENTS

| 2010/0079009 A1* | 4/2010 | Hyde ..................... H02J 17/00 307/149 |
| 2010/0161481 A1* | 6/2010 | Littrell .................... B60L 3/12 705/40 |

(Continued)

FOREIGN PATENT DOCUMENTS

| JP | 2009171642 | * | 7/2009 | .............. B60L 11/18 |
| JP | 2009171642 A | | 7/2009 | |

(Continued)

OTHER PUBLICATIONS

PCT International Search Report and Written Opinion for PCT/US2016/046139 dated Oct. 18, 2016, 10 pp.

*Primary Examiner* — Jared Fureman
*Assistant Examiner* — Duc M Pham
(74) *Attorney, Agent, or Firm* — Buckley, Maschoff & Talwalkar LLC (57) ABSTRACT

According to a first aspect there is provided a method of controlling transfer of electrical power, said method comprising: in response to formation of an electrical power transfer connection between an electrical power supply network and an electrical device, controlling electrical power transfer through said connection according to the contents, presence or absence of a message received over the connection from said device comprising one or more credentials. According to a second aspect there is provided a method of obtaining electrical power from and/or providing electrical power to an electrical power supply network, said method comprising an electrical device: forming an electrical power transfer connection with said electrical power supply network; and in response thereto, transmitting a power transfer request over said connection, said request comprising one or more credentials. According to further (Continued)

aspects there are provided a system for controlling transfer of electrical power and an electrical device.

16 Claims, 4 Drawing Sheets

(51) Int. Cl.
*G06Q 50/06* (2012.01)
*G07F 15/00* (2006.01)

(52) U.S. Cl.
CPC ...... *G07F 15/008* (2013.01); *H02J 2003/143* (2013.01); *Y02T 90/12* (2013.01); *Y02T 90/128* (2013.01)

(56) References Cited

U.S. PATENT DOCUMENTS

| | | | |
|---|---|---|---|
| 2010/0274722 A1* | 10/2010 | Roberts | G06Q 20/10 705/44 |
| 2013/0054457 A1 | 2/2013 | Strickland | |
| 2013/0110296 A1* | 5/2013 | Khoo | G06F 1/26 700/286 |
| 2016/0211703 A1* | 7/2016 | Eguchi | H04B 5/0037 |
| 2016/0225104 A1* | 8/2016 | Yamaguchi | G06Q 50/06 |

FOREIGN PATENT DOCUMENTS

| | | |
|---|---|---|
| JP | 2011164756 A | 8/2011 |
| JP | 5336639 A | 11/2013 |
| JP | 2015027228 A | 2/2015 |
| JP | 2015146162 A | 8/2015 |

* cited by examiner

CONTROLLING TRANSFER OF ELECTRICAL POWER

CROSS-REFERENCE TO RELATED APPLICATION

This application is a U.S. National Stage filing under 35 U.S.C. § 119, based on and claiming benefit of and priority to EP Patent Application No. 15181053.8 filed Aug. 14, 2015.

FIELD OF THE INVENTION

The present disclosure relates to controlling transfer of electrical power. In particular, aspects relate to methods of controlling transfer of electrical power between an electrical power supply network and an electrical device, methods of obtaining electrical power from and/or providing electrical power to an electrical power supply network, systems for controlling transfer of electrical power between and electrical device and an electrical power supply network, and electrical devices.

BACKGROUND

Figure 1:
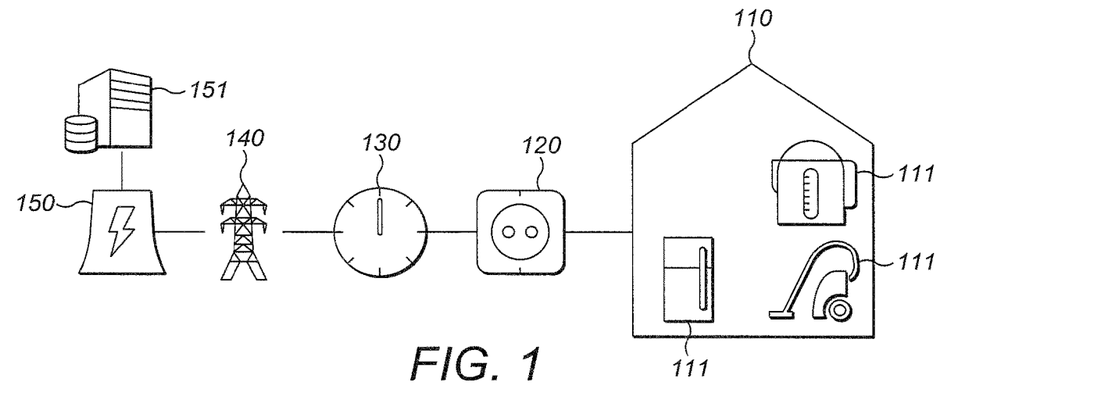
FIG. 1 illustrates a typical power supply network.

Electrical power supply networks, or "grids", are generally arranged as illustrated in FIG. 1. Each home or business 110 has a master connection 120 to a mains electricity supply, through which all the electrical devices 111 in the home or business can be powered. A meter 130 can be connected between master node 120 and transmission grid 140 to monitor electricity usage by home or business 110. Meter 130 can report back to electricity supplier 150. Electricity supplier 150 has a server 151 at which they store account information for home/business 110. The electricity supplier uses usage data received from meter 130 to determine an amount to bill the account holder and issues them with a bill, for example via post or email or through an online portal. If the account holder fails to pay their bill, the electricity supplier may cut off supply to master node 120. However, the electricity supplier may not be able to recover the cost of the electricity already supplied.

Usage reporting from electricity meters is sometimes done via power-line communication (PLC). Several different PLC standards have been developed, including for example CAN-bus/LIN-bus over power line, SAE J1772 committee, IEEE 1901, ITU-T G.hn/G.996 etc. These are all schemes to modulate the alternating current (AC) mains signal to encode messages.

In situations where multiple end users may make use of electricity from a single master node, for example an electric vehicle charging point at a public parking space or multiple households or businesses housed in a single building, additional apparatus may be installed by a middle-man (e.g. a local council or a building management company) to re-sell electricity purchased from the supplier to individual users. This apparatus ensures only users who have pre-paid for their electricity (or have been authorised to use electricity from the master node for some other reason) gain access to it. Such apparatus may be an unattended point of sale (POS) terminal to which the end users supply payment, whether by inserting coins or notes or providing payment account details, e.g. by presenting a credit or debit card. Alternatively or additionally, such apparatus could check the user's identity, for example by them providing identification data or through biometrics.

Figure 2:
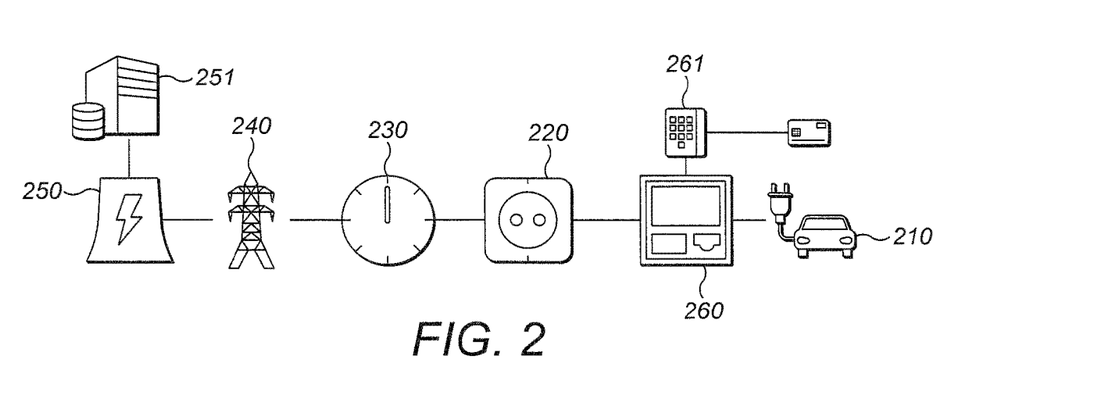
FIG. 2 illustrates a typical way in which electric vehicle charging points are connected to a power supply network.

An example of such an arrangement, as used for electric vehicle charging points, is illustrated in FIG. 2. The back end of the grid, i.e. electricity supplier 250 with server 251, transmission grid 240, meter 230 and master node 220 are all connected as in FIG. 1. In this case however, the account information held at the server is for the provider/maintainer of POS 260, for example a municipal council or car park management company. The end user plugs their vehicle 210 into a socket of POS 260 and provides payment credentials through a user interface 261 (e.g. by inserting a chip card into a card slot and entering their personal identification number (PIN) in a keypad). The POS checks the credentials (for example using an internet connection to a card issuer via a payment network, not shown) and switches on the socket into which the vehicle is plugged in response to receiving approval of the credentials.

This type of arrangement requires the end user's time to provide their credentials. It also requires the introduction of dedicated POSs to environments where they may not be desirable, e.g. due to lack of space or the local population finding them unattractive or inconsistent with the aesthetic of the locale. It also involves costs for the electricity re-seller for the acquisition, installation and maintenance of the POS. Therefore electricity re-sale POSs may not be installed at all in locations where a private re-seller could not profit from them and/or a public or charitable re-seller could not afford to subsidize them. For example, re-sale POSs may not be provided in remote locations where public charging points are desirable since those travelling to such locations are unlikely to have access to any private charging facilities in the vicinity, if any even exist. POSs may also not be provided in locations, e.g. in developing countries, where only a low proportion of the population can afford electrical devices and power for them. Access to "pay as you go" electrical power is especially desirable to such populations due to the reluctance of electricity suppliers to provide conventional credit-based electricity supply accounts to those with low and/or fluctuating incomes.

Some electrical power supply networks allow for account holders to offset their electricity bills, or even earn cash-back or other rewards, by selling electricity generated by private generator devices to the grid. For example a home or business with one or more solar panels or wind turbines or a geothermal energy extraction system can have a bi-directional trade relationship with an electricity supply company. However, to benefit from this arrangement, the account holder must connect their generator devices to the master node of their home or business, which may not always be possible. For example, electrical energy generated by the solar panel of a parked electrical or hybrid vehicle in excess of what its battery is capable of storing cannot be sold to the grid while away from home.

SUMMARY

According to a first aspect there is provided a method of controlling transfer of electrical power, said method comprising: in response to formation of an electrical power transfer connection between an electrical power supply network and an electrical device, controlling electrical power transfer through said connection according to the contents, presence or absence of a message received over the connection from said device comprising one or more credentials.

Formation of the connection could be indicated to a user of the device. Receipt of said message could be indicated to a user of the device. A timer could be started automatically, directly in response to formation of the connection. Starting of the timer could be indicated to a user of the device. A countdown clock could be communicated to a user of the device. The countdown clock could be displayed on a graphical user interface. The countdown clock could be played through a speaker.

The method could further comprise switching off the connection in response to absence of said message after a predetermined free time after formation of the connection. Switching off of the connection could be indicated to a user of the device. Absence of the message could be indicated to a user of the device.

The method could further comprise: automatically, directly in response to receiving said message, checking said credentials; and in response to refusal of the credentials, switching off the connection. Switching off of the connection could be indicated to a user of the device. Refusal of the credentials could be indicated to a user of the device.

The method could further comprise: automatically, directly in response to receiving said message, checking said credentials; and in response to acceptance of said credentials, switching off the connection a predetermined authorised time after formation of the connection. Acceptance of the credentials could be indicated to a user of the device. Switching off of the connection could be indicated to a user of the device.

The method could further comprise automatically, directly in response to receiving said message: switching off the connection; and checking said credentials. Switching off of the connection could be indicated to a user of the device. Initiation and/or progress of the credentials check could be indicated to a user of the device. The method could further comprise subsequently switching the connection back on in response to acceptance of the credentials. Acceptance of the credentials could be indicated to a user of the device. Switching back on of the connection could be indicated to a user of the device. The connection could be switched back on at a predetermined time specified in said message. The electrical device could comprise temperature control apparatus.

The method could further comprise adjusting the level of electrical power transferred through the connection according to contents of said message.

The method could further comprise indicating status of the connection to a user of the device. Status of the connection could be indicated to a user of the device by a user interface comprised in the device. Status of the connection could be indicated to a user of the device by a user interface comprised in apparatus the device is coupled to form the connection. The user interface could comprise one or more of: a graphical user interface, a speaker, an indicator lamp and a refreshable braille display. A status indication provided to a user of the device could comprise one or more of: an indication the connection has been switched off, an indication the connection has been switched on again, an indication of the power level through the connection, an indication credentials have been approved, an indication credentials have been refused, an indication credentials have not been received and an indication that credentials should be provided to access further power.

According to a second aspect there is provided a method of obtaining electrical power from and/or providing electrical power to an electrical power supply network, said method comprising an electrical device: forming an electrical power transfer connection with said electrical power supply network; and in response thereto, transmitting a power transfer request over said connection, said request comprising one or more credentials.

Said request could be transmitted automatically, directly in response to formation of the connection.

Said request could be transmitted in response to a query received over the connection.

According to a third aspect there is provided a system for controlling transfer of electrical power, said system comprising: a power adjustor configured to, in response to formation of an electrical power transfer connection between an electrical power supply network and an electrical device, control electrical power transfer through said connection according to the contents, presence or absence of a message received over the connection from said device comprising one or more credentials.

According to a fourth aspect there is provided an electrical device comprising: an electrical power input configured to form an electrical power transfer connection with an electrical power supply network; and a transmitter configured to, in response to formation of said connection, transmit a power transfer request over said connection, said request comprising one or more credentials.

The electrical device could comprise a memory storing said credentials. Said device could be a device that, in use, consumes electrical power. Said device could be a device that, in use, generates electrical power. Said device could be a device capable of operating in both a power consuming mode and a power generating mode. Said device could be one of: an electric vehicle; a portable electronic device; and a network authenticator configured to be connected to a master node of an electrical network, the request being on behalf of all other nodes of said network.

The electrical power transfer connection could comprise a wired connection. The electrical power transfer connection could comprise a wireless connection. The electrical power transfer connection could be a near-field wireless energy transmission connection such as an inductive coupling, a capacitive coupling or a magnetodynamic coupling. The electrical power transfer connection could be a mid-field wireless energy transmission connection such as a resonant inductive coupling. The electrical power transfer connection could be a far-field wireless energy transmission connection such as a microwave or light wave beam. The electrical power transfer connection could be formed using one or more of: a pair of wire coils, a pair of tuned wire coils, a pair of lumped element resonators, a pair of electrodes, a pair of rotating magnets, a parabolic dish, a phased antenna array, a rectenna, a laser, a photocell and a lens.

The electrical power transfer connection could be through apparatus located on a lamppost.

The credentials could comprise identification data. The credentials could comprise payment account data. The credentials could comprise subscription data.

The credentials could be stored on a cloud server with which the aforesaid device can communicate. The credentials could be stored on a portable electronic device with which the aforesaid device can communicate. The credentials cold be stored on a cloud server with which the aforesaid device can communicate via a portable electronic device.

The credentials could be stored in a secure element.

The credentials could be provided to the device by user input to a user interface of the device. Said user interface could comprise one or more of: a microphone, a keypad, a touch screen, a button, a joystick and a mouse. Said user input could be in response to a query received by the device over the connection.

The credentials could be transmitted in response to user input. Said user input could be to a user interface comprised in the device. Said user input could be to a user interface comprised in apparatus the device is coupled to form the connection.

The further power could be to power concurrent operation of the device. The further power could be to charge a battery of the device.

BRIEF DESCRIPTION OF THE DRAWINGS

Implementations will now be described in detail, by way of example only, with reference to the accompanying drawings, in which.

The following description is presented to enable any person skilled in the art to make and use the system, and is provided in the context of a particular application. Various modifications to the disclosed embodiments will be readily apparent to those skilled in the art.

DETAILED DESCRIPTION

It is proposed to control transfer of electrical power between an electrical power supply network and an electrical device according to the contents, presence or absence of a message comprising one or more credentials received over the power connection from said device. That is, an electrical device connects to a power supply and authenticates itself to the electrical power supplier in order to receive further power, or to initiate payment to the device owner for power provided by the electrical device to the supply network.

The device supplies its credentials by piggy-backing on the power signal itself, by means of PLC in a wired power connection or using modulation of the alternating electromagnetic field in a wireless energy transmission connection.

A power adjustor on the grid side of the connection can be used to switch off the connection if no credentials are received or if they are refused, e.g. having failed an authentication procedure. Alternatively, the power adjustor could be set by default to limit power through the connection to a "trickle" sufficient to permit communication of credentials but not to permit significant power transfer, and to lift such restriction in response to approval of device credentials. The power adjustor could also modify the power supplied in other ways, for example to provide slower or quicker charging depending on the contents of the message received from the device.

Figure 3A:
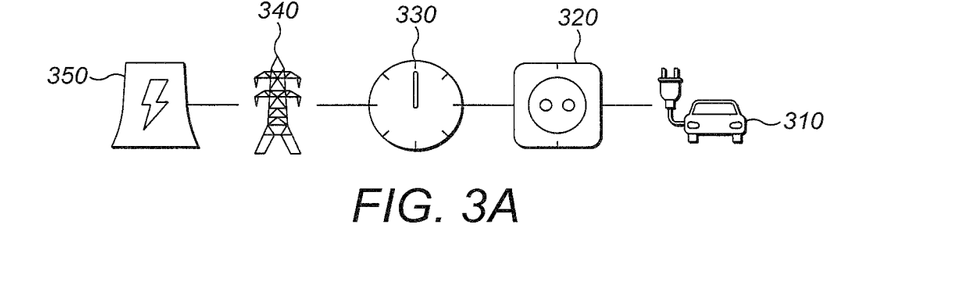
FIG. 3A illustrates an example network arrangement.

FIG. 3A illustrates an example network arrangement, e.g. for electric vehicle charging. In this example, the electrical device 310 is directly connected to the node 320; no physical POS terminal is needed. The connection could be wired, e.g. by plugging an electric car battery charging cable into a socket of the node, or could be wireless, e.g. the car could be parked on an inductive charging pad drawing power from the node. Power supply to the node from electricity supplier 350 via transmission grid 340 is controlled by power adjustor 330.

Figure 3B:
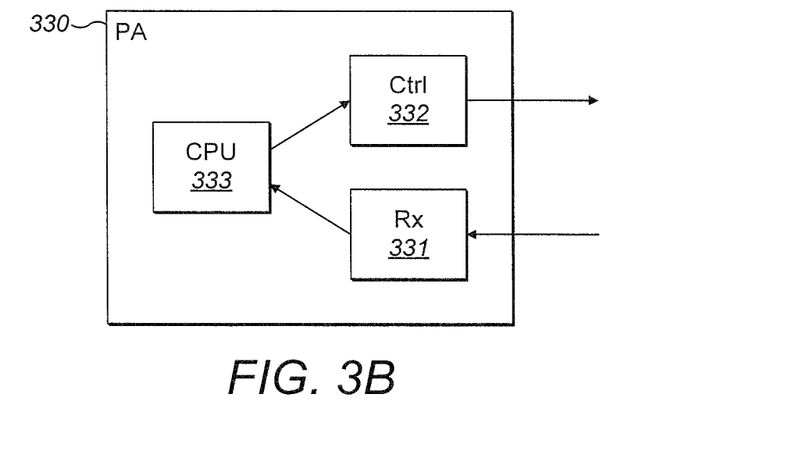
FIG. 3B schematically illustrates a power adjustor.

Power adjustor 330 is illustrated in further detail in FIG. 3B. It comprises a receiver 331 for receiving messages passed from the device to the node and a controller 332 for varying the power supplied to the node. Receiver 331 reports to processor 333, which in turn instructs controller 332 according to the presence, absence or contents of messages received by the receiver.

The components of power adjustor 330 need not be grouped in one location. Receiver 331 and controller 332 can be located anywhere that permits them to isolate node 320 from electricity supplier 350. Processor 333 could be a single processor or could comprise several processors at distributed locations, in communication with one another. Power adjustor 330 could be capable of adjusting power transfer through a single node 320, multiple nodes, or even all nodes in a network.

Controller 332 is linked to node 320 via a powered connection. Receiver 331 could be linked to node 320 via a powered connection or via a relay that converts the message received at node 320 from device 310 into a message suitable for transmission over more conventional telecommunication channels, whether wired or wireless. The connection between processor 333 and controller 332, and between processor 333 and receiver 331, can be powered or can be via any other form of wired or wireless telecommunication link, for example over a telephone line, or through a cellular network or a satellite link.

Power adjustor 330 could also comprise metering functions. It could comprise a virtual POS. It could comprise a database of user credentials and/or account information.

Figure 3C:
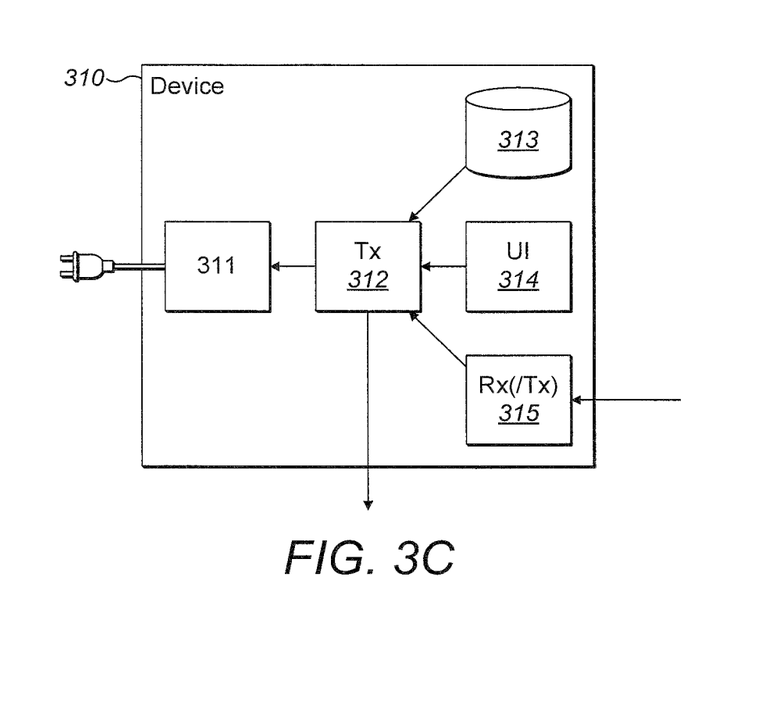
FIG. 3C schematically illustrates an electrical device.

FIG. 3C illustrates electrical device 310 in further detail. It comprises power connection apparatus 311, transmitter 312 connected to power connection apparatus 311 and at least one of memory 313, user input device 314 and receiver/transceiver 315 connected to transmitter 312. Credentials may be stored in memory 313 and transmitted over the power connection automatically or according to a user instruction. Alternatively, credentials may be input to user input device 314 by a user. As another option, credentials could be received by receiver/transceiver 315, e.g. in response to a credentials request issued by the device 310 via transmitter 312 or transceiver 315 to a remote credentials store, e.g. on a cloud server.

Figure 4:
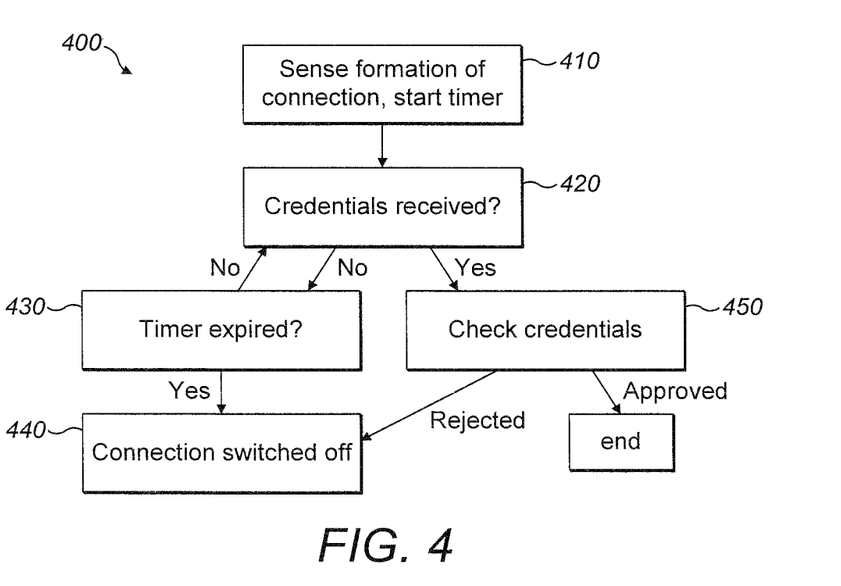
FIG. 4 is a flowchart of an example method of controlling access to electrical power from a power supply.

FIG. 4 is a flowchart of an example method 400 of controlling access to electrical power from a power supply, such as may be performed by a controller 330. At 410, the formation of a powered connection between an electrical device and the power supply is sensed and a timer of a predetermined duration is started. At this stage, the power transfer over the connection could optionally be limited by the power adjustor to a trickle sufficient to allow communication but not significant energy transfer. At 420, it is checked whether a message comprising credentials has been received over that connection.

If not, the timer is checked at 430. If the timer has not yet expired, the process flow loops back to 420. If the timer has expired, the connection is switched off at 440. This prevents devices not configured to provide credentials, or devices operated by users who refuse to provide credentials, from gaining access to more power than that required to give the device a chance to provide credentials.

If at 420 credentials have been received, these are checked at 450. The timer could also be cleared at this point. If the credentials are rejected, the connection is switched off at 440. Otherwise, the connection remains on. If the power transfer was initially limited to a trickle, it could be increased by the power adjustor in response to approval of the credentials.

The method of FIG. 4 limits the "free" power obtainable to that which can be drawn in the time taken to receive and check the credentials. The "free" power obtainable can be limited further by using the alternative method 500 shown in FIG. 5.

Figure 5:
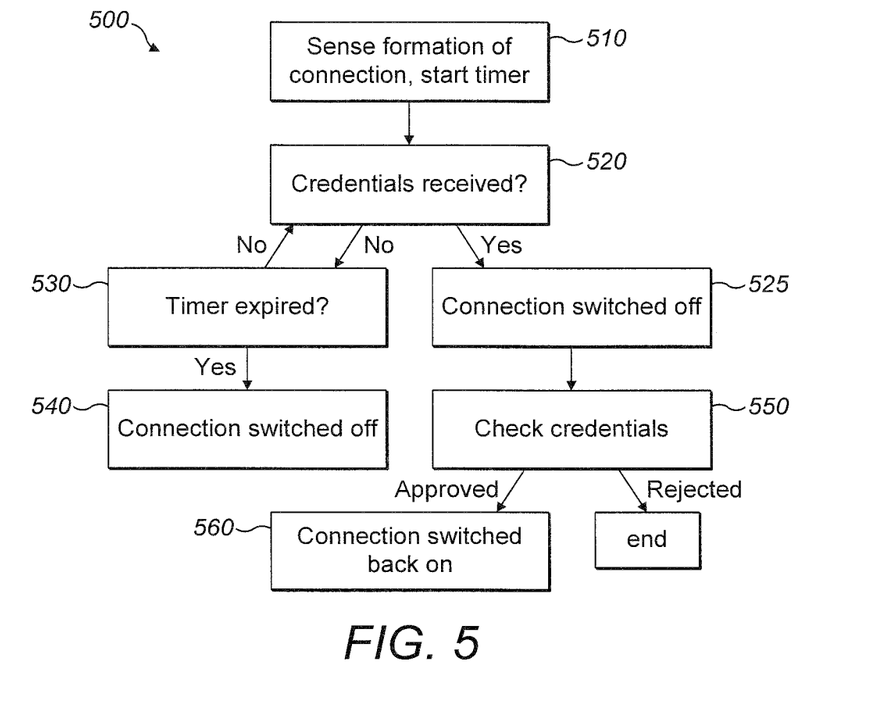
FIG. 5 is a flowchart of an alternative method.

At 510, the formation of a powered connection between an electrical device and the power supply is sensed and a timer of a predetermined duration is started. At 520, it is checked whether a message comprising credentials has been received over that connection.

If not, the timer is checked at 530. If the timer has not yet expired, the process flow loops back to 520. If the timer has expired, the connection is switched off at 540.

If at 520 credentials have been received, then at 525 the connection is switched off. The credentials are then checked at 550. If the credentials are approved, the connection is switched back on at 560 (and, if the initial power transfer was limited to a trickle, the power level is increased to allow for significant energy transfer).

Otherwise, the connection remains off. The timer can also be cleared at 525, 550 or 560.

At either of 410 or 510, credentials could be requested. At either of 450 or 525, receipt of the credentials could be acknowledged. At any of 410, 510, 440, 540, 525 or 560 a status indication could be provided to a user of the device. This could be done through a user output device of the device (in response to a message sent over the connection) or through a user output device of the power adjustor.

If approval of the credentials is for obtaining a predetermined (e.g. pre-paid or pre-approved) quantity of power, then at 560 a second timer could be started, on expiry of which the connection could be switched off. Alternatively, instead of a second timer, an electricity meter could be used, with the connection being switched off when the meter records a predetermined value.

The switching on at 560 could be delayed. For example, the message from the device comprising the credentials could also comprise a desired switch on time. This could be useful, for example, if the device is an electric car with an electrically powered heater parked in a charging spot overnight when cold weather is anticipated the following morning. The heater could be set to come on when the car is charging and the charging could be set to start, for example, 1 hour before the car is due to be used for a commute in the morning.

The power adjustor could be a switch, only capable of turning power on or off, or could be capable of varying the power supplied e.g. using a variable transformer. This could be done according to the contents of the message sent by the device over the connection. For example, at a charging station there could be options of a fast 1 hour 100 A charge or a slow 3 hour 300 A charge. These could be accessible to all users, with the fast charge costing more, so that a car being parked overnight could be given a cheaper slow charge whereas a user in a hurry to charge their car might opt to pay extra for a fast charge. Alternatively, the fast charge option might only be accessible to devices linked to certain subscriptions. For example a pay-as-you-go user or basic subscriber might not have access to fast charging, a basic subscriber may be able to pay a surcharge for fast charging and a premium subscriber may receive fast charging as standard.

This technology could make use of existing power infrastructure. For example, since there would not be any need for POSs at electric vehicle charging points, sockets could be provided in existing powered street furniture such as lampposts, illuminated signage or video advertising hoardings.

This type of arrangement is not only useful for electric vehicle charging stations but could also be used in other scenarios. For example, some shopping centres and other public spaces now host banks of lockers in which mobile devices such as mobile phones, smartphones, tablets, music players etc. can be securely stored and charged. Each locker or each charging point could comprise a controller 332 so that users are charged for the electricity they draw, instead of or in addition to a flat fee for opening a locker. Since many smartphones and tablets already store payment credentials, the only physical modification required to their design would be the addition of a PLC (or equivalent inductive messaging) transmitter.

The arrangement described could also be used in shared buildings such as apartment buildings, office blocks, student halls of residence, hotels etc. This would allow for electricity usage in such buildings to be billed to individual users.

The process of arranging for electricity supply on moving home could also be made easier using this technology. The account holder of each household could be provided with a network authenticator device which they plug into a master socket of their home in order to take responsibility for payment for all electricity supplied through the home's master node. On moving into a new home, there would be no need to contact the electricity supplier, the only action needed would be to transport the network authenticator from the old home to the new one and plug it in to the master socket.

This technology also allows end users to purchase electricity from a supplier of their choice, wherever they connect their device to the grid. If they are a customer of a particular electricity supplier, whether due to preferring their charging model, rates, customer service or energy generation methods (e.g. some users may choose to only purchase electricity generated from a renewable source), the credentials can indicate this so that electricity is always purchased from that supplier.

The credentials provided in the message sent from the device over the power connection could comprise payment credentials. For example they could comprise a personal account number (PAN) associated with a particular debit or credit card account, together with a card expiry date, issue date and card verification value (CVV). The credentials check could then be done according to a protocol such as EMV. Electricity could thus be paid for using a pay-as-you-go model. A predetermined quantity of power could be purchased in advance, or the payment details could be pre-approved then the account charged following disconnection of the device from the power supply.

Alternatively or additionally, the credentials could comprise identification credentials for the device and/or the user. Some devices or users could be pre-approved for a predetermined quantity of power, or unlimited power usage. For example, in the municipal electric car charging scenario, a certain car manufacturer could sell their cars (or a particular model) with a prepaid quantity of charging power or an unlimited subscription. In that case the credentials need not be unique to the device or the end user, they could simply identify the car manufacturer as the ultimate bill payer. Similarly, the government may cover the cost of charging of state-provided mobility scooters, electric cars for handicapped people or certain public sector employees. Electricity suppliers may issue devices to their employees which can be charged/powered without any need for sale of the electricity used. Where the electrical device is a generator device, for example a parked solar-powered vehicle, the credentials could comprise sufficient identification details for the electricity supplier to determine an account to make payment for the power provided to, and/or to ensure money laundering regulations are complied with.

The credentials could comprise subscription account data; so that checking of the credentials comprises only checking that said account is registered in good standing with the electricity supplier. The account holder could then be billed periodically for past usage, or could pay up-front for limited or unlimited usage for a certain period. Account holders could be individuals or organisations. For example, company electric cars and company mobile devices could be issued to staff with built-in credentials ensuring the company is billed directly for powering/charging them, removing the need for the employee to make an expenses claim.

The electrical power transfer connections described herein could be wired or wireless. Wireless connections could be near-field (non-radiative), such as through inductive coupling of a pair of wire coils in the device and e.g. a charging mat, through capacitive coupling of a pair of electrodes in the device and the node, or through magneto-dynamic coupling of a pair of rotating magnets in the device and e.g. a node buried under an electric vehicle parking space. Alternatively, wireless connections could be mid-field, such as through resonant inductive coupling of a pair of tuned wire coils, lumped element resonators or piezoelectric ultrasound transducers in the device and node. Wireless connections could even be far-field, such as through beaming of light or microwave energy e.g. aiming a laser or maser at photocells (possibly using lensing), or by aiming a phased microwave antenna array at a rectenna e.g. in a parabolic focusing dish. Far-field connections could be particularly useful for providing access to the grid from particularly remote and/or economically deprived locations. For example a mobile node could be provided which travels around villages in a region to permit re-selling of electricity for charging of local batteries.

Figure 6:
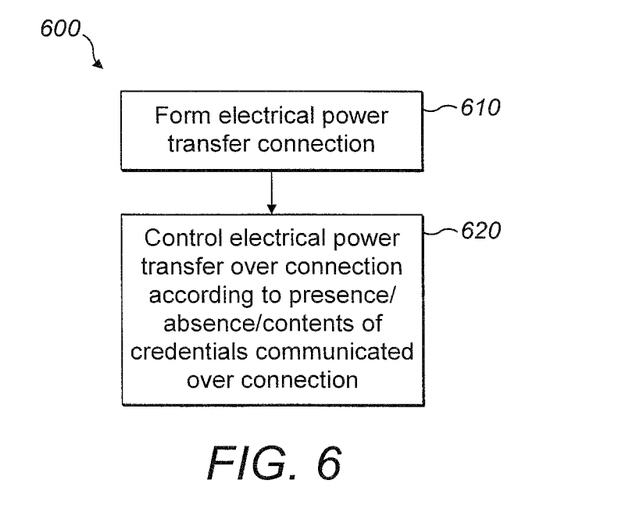
FIG. 6 is a flow chart of another example method.

FIG. 6 is a flowchart of a method 600 wherein, at 610 an electrical power transfer connection is formed, and at 620 electrical power transfer over said connection is controlled according to the presence, absence or contents of credentials communicated over the connection.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

The invention claimed is:

1. A method comprising:
   sensing, via a power adjustor, an electrical power transfer connection between an electrical power grid and an electrical device to be charged;
   detecting, via the power adjustor, payment account information inserted by the electrical device to be charged into a power transfer request message transmitted from the electrical device to be charged to the electrical power grid via the electrical power transfer connection; and
   controlling, via the power adjustor, how much electrical power is transferred from the electrical power grid to the electrical device based on the payment account information included in the power transfer request message,
   wherein the power adjustor is configured to restrict power through the transfer connection to permit communication of the power transfer request message but not to permit significant power transfer, and to lift such restriction in response to approval of the payment account information.

2. The method of claim 1, further comprising switching off the connection, via the power adjustor, in response to absence of said power transfer request message after a predetermined period of time after formation of the connection.

3. The method of claim 1, further comprising:
in response to receiving said power transfer request message, determining, via the power adjustor, to reject power transfer to the electrical device to be charged based on the payment account information included in the message received via the connection, and switching off the connection.

4. The method of claim 1, further comprising:
in response to receiving said power transfer request message, determining, via the power adjustor, to authorize power transfer to the electrical device to be charged based on the payment account information included in the message received via the connection, and switching off the connection for a predetermined period of time after formation of the connection.

5. The method of claim 1, further comprising automatically switching off the connection, via the power adjustor, in response to receiving the message and checking said payment account information.

6. The method of claim 5, further comprising subsequently switching the connection back on, via the power adjustor, in response to acceptance of the payment account information.

7. The method of claim 6, wherein the connection is switched back on at a predetermined time specified in said power transfer request message.

8. The method of claim 1, further comprising adjusting, via the power adjustor, a level of electrical power transferred through the connection according to contents of said message.

9. The method of claim 1, further comprising outputting a status of the connection to a user interface of the electrical device to be charged.

10. The method of claim 1, wherein the detecting comprises detecting, via the power adjustor, the power transfer request message including the payment account information piggy-backed on a wired power signal via a programmable logic circuit (PLC) in a wired power connection between the electrical device to be charged and the electrical power supply network.

11. The method of claim 1, wherein the detecting comprises detecting, via the power adjustor, the power transfer request message including the payment account information piggy-backed on a wireless energy transmission connection signal using modulation of an alternating electromagnetic field in a wireless power connection between the electrical device to be charged and the electrical power supply network.

12. A method comprising:
forming an electrical power transfer connection between an electric device to be charged and said electrical power supply network, via a power adjustor;
receiving, via the power adjustor, a power transfer request message comprising payment account information stored in a memory of the electrical device to be charged; and
controlling, via the power adjustor, transfer of power on the electrical power transfer connection between the electric device to be charged and the electrical power supply network based on the payment account information included in the power transfer request message,
wherein the power adjustor is configured to restrict power through the transfer connection to permit communication of the power transfer request message but not to permit significant power transfer, and to lift such restriction in response to approval of the payment account information.

13. The method of claim 12, wherein the power transfer request message is transmitted automatically, in response to formation of the connection.

14. The method of claim 12, wherein the power transfer request message is transmitted in response to a query received over the connection.

15. A system for controlling transfer of electrical power, said system comprising:
a power adjustor configured to
sense formation of an electrical power transfer connection between an electrical power supply network and an electrical device to be charged,
detect payment account information inserted by the electrical device to be charged into a power transfer request message transmitted from the electrical device to be charged to the electrical power supply network via the electrical power transfer connection, and
control how much electrical power is transferred from the electrical power grid to the electrical device based on the payment account information included in the power transfer request,
wherein the power adjustor is configured to restrict power through the transfer connection to permit communication of the power transfer request message but not to permit significant power transfer, and to lift such restriction in response to approval of the payment account information.

16. The system of claim 15, wherein the power transfer request message comprises a primary account number (PAN) and an expiry which are stored in the memory of the electrical device to be charged.

* * * * *